United States Patent
Seng et al.

(10) Patent No.: US 8,635,567 B1
(45) Date of Patent: Jan. 21, 2014

(54) ELECTRONIC DESIGN AUTOMATION TOOL FOR GUIDED CONNECTION ASSISTANCE

(71) Applicant: Xilinx, Inc., San Jose, CA (US)

(72) Inventors: Shay P. Seng, San Jose, CA (US); Krishnan Subramanian, San Jose, CA (US); Robert E. Shortt, Sunnyvale, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 13/649,593

(22) Filed: Oct. 11, 2012

(51) Int. Cl.
 *G06F 17/50* (2006.01)
(52) U.S. Cl.
 CPC ........ *G06F 17/5081* (2013.01); *G06F 17/5045* (2013.01)
 USPC ........... 716/106; 716/102; 716/111; 716/139; 703/16
(58) Field of Classification Search
 CPC .................. G06F 17/5045; G06F 17/5081
 USPC ............... 716/106, 102, 111, 139; 703/16
 See application file for complete search history.

(56) References Cited

U.S. PATENT DOCUMENTS

| | | | | |
|---|---|---|---|---|
| 5,111,413 A | * | 5/1992 | Lazansky et al. | 703/14 |
| 5,422,833 A | * | 6/1995 | Kelem et al. | 703/14 |
| 5,995,730 A | * | 11/1999 | Blinne | 716/103 |
| 7,181,705 B2 | * | 2/2007 | Dervisoglu et al. | 714/727 |
| 7,184,946 B2 | * | 2/2007 | Ballagh et al. | 703/23 |
| 7,340,705 B1 | * | 3/2008 | Massabki et al. | 716/111 |
| 8,069,286 B1 | * | 11/2011 | Orthner et al. | 710/62 |
| 8,095,898 B1 | * | 1/2012 | Wu et al. | 716/102 |
| 8,121,826 B1 | * | 2/2012 | Neely et al. | 703/14 |
| 8,122,414 B1 | * | 2/2012 | Lindop et al. | 716/118 |
| 8,191,034 B1 | * | 5/2012 | Mohan | 716/136 |
| 8,370,791 B2 | * | 2/2013 | Ogami et al. | 716/139 |
| 2003/0115564 A1 | * | 6/2003 | Chang et al. | 716/8 |
| 2005/0172245 A1 | * | 8/2005 | Anderson | 716/3 |
| 2005/0273736 A1 | * | 12/2005 | Youngman et al. | 716/4 |
| 2006/0230377 A1 | * | 10/2006 | Rapp et al. | 716/18 |
| 2011/0179180 A1 | * | 7/2011 | Schleifer et al. | 709/227 |
| 2011/0271242 A1 | * | 11/2011 | Baumgartner et al. | 716/103 |
| 2011/0276932 A1 | * | 11/2011 | Baumgartner et al. | 716/106 |

* cited by examiner

*Primary Examiner* — Phallaka Kik (74) *Attorney, Agent, or Firm* — Kevin T. Cuenot (57) ABSTRACT

A method of circuit design includes receiving a user input selecting a first interface of a circuit block of a circuit design as a source interface in creating a connection within the circuit design and selecting a second interface of the circuit design as a candidate destination interface for the connection using a processor. The method further includes determining compatibility between the second interface and the first interface and indicating compatibility of the second interface with the first interface for the connection.

14 Claims, 4 Drawing Sheets

ELECTRONIC DESIGN AUTOMATION TOOL FOR GUIDED CONNECTION ASSISTANCE

FIELD OF THE INVENTION

One or more embodiments disclosed within this specification relate to electronic design automation (EDA) tools.

BACKGROUND

Modern electronic design automation (EDA) tools allow a user to specify a circuit design at a high level of abstraction. Typically, the user is able to drag-and-drop blocks that represent portions of circuitry such as Intellectual Property (IP) blocks, cores, functional blocks such as multipliers, dividers, and/or digital signal processors, etc. into a graphical design area. The user can position the blocks in the design area, connect or wire particular ones of the blocks together, and initiate operations upon the circuit design such as place and route, simulate the response of the circuit design to various stimuli, or the like. The aforementioned activities can be performed without the user having to specify the circuit design at the individual component level (e.g., transistor level) and without having to manually generate or code hardware description language.

SUMMARY

A method of circuit design includes receiving a user input selecting a first interface of a circuit block of a circuit design as a source interface in creating a connection within the circuit design and selecting a second interface of the circuit design as a candidate destination interface for the connection using a processor. The method further includes determining compatibility between the second interface and the first interface and indicating compatibility of the second interface with the first interface for the connection.

A user interface (UI) of an electronic design automation tool includes a first visual element displayed on a screen representing a first circuit block of a circuit design, a second visual element displayed on the screen representing a first interface of the first circuit block, and a third visual element displayed on the screen representing a second interface of the circuit design. The UI further includes a fourth visual element displayed on the screen indicating compatibility of the first interface with the second interface. The first, second, third, and fourth visual elements are displayed concurrently.

A non-transitory computer-readable medium with an executable program stored thereon, wherein the program when executed on a processor perform a method that includes: receiving a user input selecting a first interface of a circuit block of a circuit design as a source interface in creating a connection within the circuit design, selecting a second interface of the circuit design as a candidate destination interface for the connection, and determining compatibility between the second interface and the first interface. Compatibility of the second interface with the first interface is indicated for the connection.

DETAILED DESCRIPTION OF THE DRAWINGS

While the specification concludes with claims defining novel features, it is believed that the features disclosed within this specification will be better understood from a consideration of the description in conjunction with the drawings. The process(es), machine(s), manufacture(s), systems, and any variations thereof described within this specification are provided for purposes of illustration. Specific structural and functional details disclosed within this specification are not to be interpreted as limiting, but merely as a basis for the claims and as a representative basis for teaching one skilled in the art to variously employ the features described in virtually any appropriately detailed structure. Further, the terms and phrases used within this specification are not intended to be limiting, but rather to provide an understandable description of the features described.

This specification relates to electronic design automation (EDA) tools and, more particularly, to an EDA tool that facilitates connectivity between circuit blocks of a circuit design. In accordance with the inventive arrangements disclosed within this specification, an EDA tool is configured to provide guided assistance to users in establishing connections between circuit blocks. In one aspect, the EDA tool indicates compatibility among interfaces of a circuit design. As a user specifies or draws a circuit design, for example, the EDA tool can indicate compatibility among interfaces of the various circuit blocks used within the circuit design. Compatibility among the interfaces can be indicated in real time. As used herein, the phrase "real time" means a level of processing responsiveness that a user or system senses as sufficiently immediate for a particular process or determination to be made, or that enables the processor to keep up with some external process such as ongoing or continuous user input. Varying levels of compatibility, as described within this specification in further detail, also can be indicated to the user.

Figure 1:
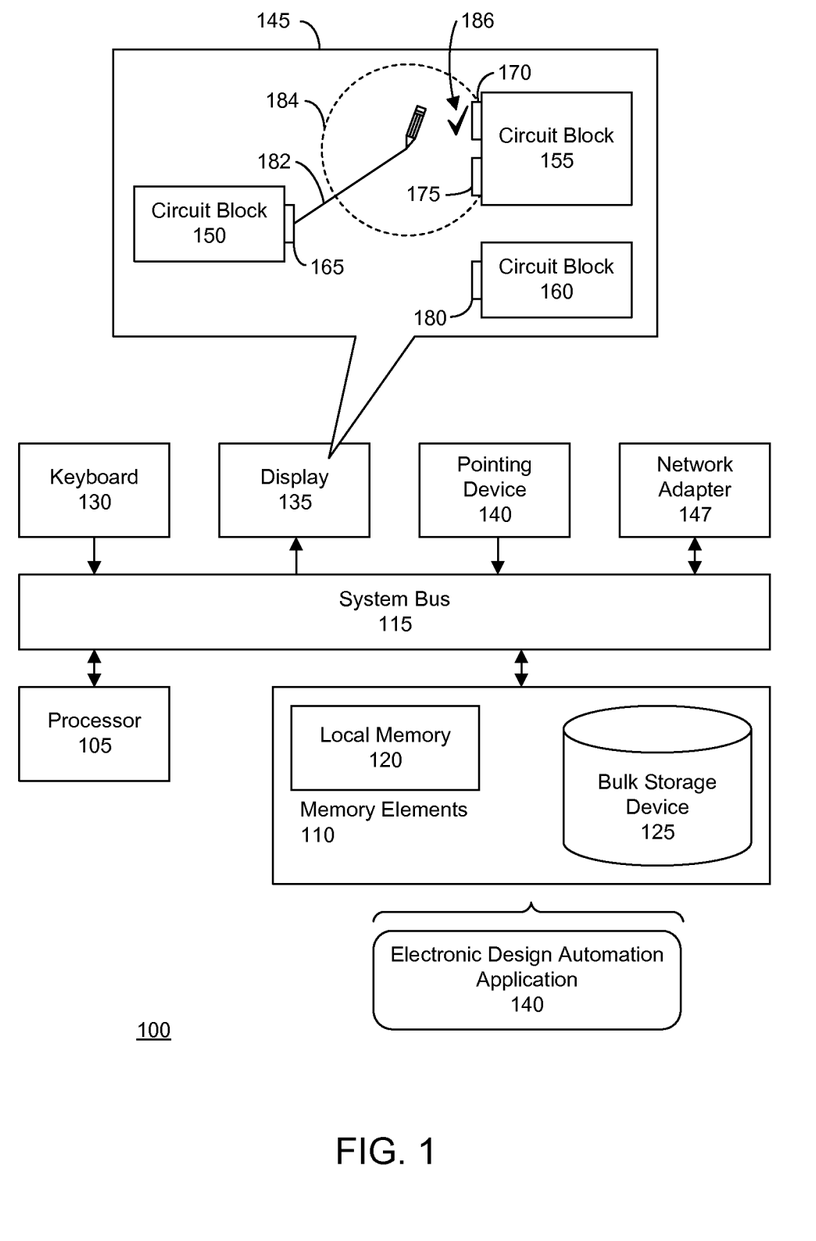
FIG. 1 is a first block diagram illustrating an example of an electronic design automation (EDA) tool for guided connection assistance.

FIG. 1 is a first block diagram illustrating an example of an EDA tool 100 for guided connection assistance. EDA tool 100 allows a user to create a circuit design by specifying the circuit design at an interface and/or a port level. EDA tool 100 is configured to provide connection assistance to a user in real time during construction of the circuit design as opposed to when the circuit design is fully constructed or after a connection is specified completely. For example, EDA tool 100 indicates a level of compatibility between interfaces as part of, and/or during, a connection operation.

EDA tool 100 includes at least one processor 105, e.g., a central processing unit, coupled to memory elements 110 through a system bus 115 or other suitable circuitry. As such, EDA tool 100 stores program code within memory elements 110. Processor 105 executes the program code accessed from memory elements 110 via system bus 115. In one aspect, for example, EDA tool 100 is implemented as a computer or other programmable data processing apparatus that is suitable for storing and/or executing program code. It should be appreciated, however, that EDA tool 100 can be implemented in the form of any system including a processor and memory that is capable of performing the functions or executable operations described within this specification. An "executable operation" refers to a function performed by a processor in following instructions, such as program code, read from a memory.

Memory elements 110 can include one or more physical memory devices such as, for example, local memory 120 and one or more bulk storage devices 125. Local memory 120 refers to random access memory or other non-persistent memory device(s) generally used during actual execution of the program code. Bulk storage device(s) 125 can be implemented as a hard drive or other persistent data storage device. EDA tool 100 also can include one or more cache memories (not shown) that provide temporary storage of at least some program code in order to reduce the number of times program code must be retrieved from bulk storage device 125 during execution.

Input/output (I/O) devices such as a keyboard 130, a display (or screen) 135, and a pointing device 140 optionally can be coupled to EDA tool 100. The I/O devices can be coupled to EDA tool 100 either directly or through intervening I/O controllers. A network adapter 147 also can be coupled to EDA tool 100 to enable EDA tool 100 to become coupled to other systems, computer systems, remote printers, and/or remote storage devices through intervening private or public networks. Modems, cable modems, and Ethernet cards are examples of different types of network adapter 147 that can be used with EDA tool 100.

As pictured in FIG. 1, memory elements 110 store an EDA application 140. EDA application 140, being implemented in the form of executable program code, can be executed by EDA tool 100 and, as such, is considered part of EDA tool 100. EDA tool 100 is configured to facilitate circuit design through a user interface such as a graphical user interface (GUI) and/or a command line type of interface.

As illustrated, EDA tool 100 generates, or displays, a view 145 on display 135. View 145 is part of the GUI generated by EDA tool 100 through which a user can create, edit, or modify, a circuit design. The circuit design, or a portion thereof, pictured within view 145 includes circuit blocks 150, 155, and 160. Circuit block 150 includes an interface 165. Circuit block 155 includes interfaces 170 and 175. Circuit block 160 includes an interface 180.

Each of circuit blocks 150-160 is a visual element displayed within a GUI that represents a portion of circuitry within the circuit design. In some cases, each circuit block is associated with one or more parameters specifying attributes (e.g., electrical attributes) of the circuitry represented by the circuit block. In other cases, each circuit block can represent an Intellectual Property (IP) core, hardware description language, etc. specifying circuitry.

Each interface of a circuit block includes a plurality of signals that are either output from, or received as input to, the circuit block. Each interface includes one or more ports. Each port includes one or more signals. An interface, similar to a circuit block, can be specified by one or more parameters defining attributes (e.g., electrical attributes) of the interface. The attributes of the interface collectively can be referred to as a "definition" for the interface. Examples of attributes for an interface can include, but are not limited to, a version name, a vendor name, a port list indicating which ports are included in the interface, port widths, how a protocol of the interface is to be interpreted for one or more ports, or the like.

In the example presented in FIG. 1, a user is manipulating an onscreen pointer illustrated as a drawing tool, e.g., a pencil. For example, the pointer can be controlled by pointing device 140 (e.g., a mouse, trackball, touch screen, or the like). A "user" refers to a human being that operates or uses EDA tool 100. Under user control, the pointer is establishing a connection, represented by line (connection) 182. Connection 182 begins or starts at a first interface, i.e., interface 165. As such, interface 165 is considered a "source" interface, which is the origination point of connection 182. As the user continues to move the pointer in creating connection 182, EDA tool 100 locates other interfaces that may be used as destination interfaces, e.g., the ending point of connection 182.

A connection, as illustrated within FIG. 1, refers to a logical association of a source interface (e.g., the ports and/or signals of the source interface) with a destination interface (e.g., the ports and/or signals of the destination interface) within the circuit design. During actual implementation of the circuit design (e.g., physical synthesis), physical wires are inferred or used to connect the physical interface represented by the source interface with the physical interface represented by the destination interface based upon the connection within the circuit design.

As the pointer continues to move about within view 145 under control of the user, EDA tool 100 indicates those interfaces that are compatible with interface 165. An interface that is compatible with interface 165 is visually distinguished from other interfaces that are not compatible with interface 165. As pictured, EDA tool 100 has displayed visual element 186 next to interface 170 indicating that interface 170 is compatible with interface 165. Thus, interface 170 can be used as a destination interface paired with source interface 165 to establish or create connection 182. Interfaces 175 and 180, shown without visual indicators, are not compatible with interface 165.

Selection of interface 165 as the source interface is performed by the user. For example, the user can initiate a connection operation in which interface 165 is selected. In illustration, the user can select a "connection" command within EDA tool 100, and begin drawing a line starting at interface 165, thereby selecting interface 165 as the source interface. Selecting the destination interface can be performed by the user ending the line, e.g., drawing or continuing the line representing connection 182, to end, or have an ending point, at the destination interface.

In general, EDA tool 100 indicates which interfaces are compatible with source interface 165 during the connection operation. While the user draws connection 182, the EDA tool indicates which interfaces of interfaces 170, 175, and 180 are compatible with interface 165. In the example shown, while the user draws connection 182, the EDA tool determines that interface 170 is the only interface compatible with interface 165 and, as such, displays visual element 186 indicating compatibility while the user is in the process of drawing connection 182 (during the connection operation).

In one aspect, EDA tool 100 can limit the number of interfaces that are considered for compatibility with the source interface so as to reduce the number of visual elements displayed and reduce onscreen "clutter." In one example, EDA tool 100 can use proximity detection in limiting the number of interfaces that are evaluated for compatibility. In illustration, EDA tool 100 can indicate compatibility of only those interfaces that are within a maximum distance, as measured onscreen, of the pointer while the pointer is under user control drawing a connection (during a connection operation).

In FIG. 1, the maximum distance with respect to the pointer is illustrated in the form of the radius of circle 184. For example, both interfaces 170 and 175 are located within circle 184. As such, interfaces 170 and 175 are located less than the maximum distance from the pointer and are evaluated for compatibility with interface 165, while interface 180, being located outside of circuit 184 is not. Since no visual element indicating compatibility is located next to interface 175 by EDA tool 100, the user is informed that interface 170 is compatible with interface 165 while interface 175 is not compatible with interface 165.

In one aspect, circle 184, e.g., the predetermined distance, is a user specifiable parameter. Circuit 184, or the area within circle 184, can be visually indicated on display 135 within view 145. Alternatively, circuit 184 is not visually indicated on display 135 within view 145.

While proximity detection of interfaces can be used as a filter for limiting those interfaces evaluated for compatibility with the source interface, in another example, the proximity of the circuit blocks can be used. For example, rather than determining the distance between interfaces in relation to the pointer, the distance of circuit blocks such as circuit blocks 155 and 160 from the pointer can be determined. A point, e.g., a center or centroid, within each circuit block can be used as the location of the circuit block for calculating distance from the pointer. When the distance from the pointer to a circuit block does not exceed the maximum distance, the interfaces of the circuit block are evaluated for purposes of compatibility with the source interface.

FIG. 1 is presented for purposes of illustration only and, as such, is not intended as a limitation. For example, the distance from the pointer need not be the same in all directions resulting in area in shapes other than a circle. The particular visual elements used to indicate compatibility also can be changed. For example, highlighting can be used. In addition, rather than not presenting any indication for an incompatible interface, a visual element indicating incompatibility can be displayed to indicate that the interface was considered for compatibility with the source interface.

Figure 2:
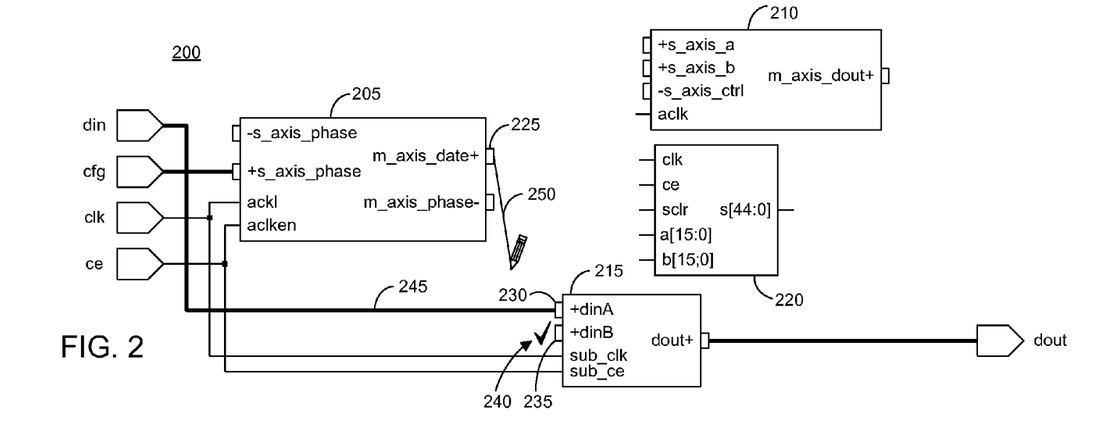
FIG. 2 is an exemplary view presented by a user interface of the EDA tool of FIG. 1.

FIG. 2 is an exemplary view 200 presented by the user interface of the EDA tool of FIG. 1. As shown, the view includes a plurality of pins illustrated as "din," "cfg," "clk," "ce," and "dout." The visual elements for each of pins din, cfg, and dout represent more than one pin and, as such, more than one signal as represented by the thicker signal lines used to illustrate connections. The visual element for pin clk represents a single pin and a single signal, as does the visual element for ce.

View 200 further illustrates circuit blocks 205, 210, 215, and 220 forming a circuit design or a portion of a circuit design. In the example presented, the user has selected interface 225 as the source interface in a connection operation and is drawing connection 250. The user is moving the pointer from interface 225 to circuit block 215 as the connection operation continues. As discussed, the EDA tool determines that the distance between the pointer and either circuit block 215 or each of interfaces 230 and 235 of circuit block 215 does not exceed the maximum distance.

In one example, interfaces 230 and 235 are considered for purposes of compatibility with interface 225. In another example, since interface 230 is already connected to another signal, i.e., used for completing another connection shown as connection 245, interface 230 is not considered for purposes of compatibility with interface 225 since interface 230 is not available to become a destination interface for connection 250. Instead, only interface 235 is considered and, in this example, found to be compatible with interface 225. As such, a visual element 240 is displayed next to interface 235 indicating compatibility of interface 235 with interface 225 to the user.

In the example shown, since interface 235 is compatible with interface 225, interface 235 is considered a candidate destination interface. Interface 235 is not a destination interface for connection 250 until such time that the connection operation is completed with interface 235 being designated as the destination interface by terminating the line representing connection 250 at interface 235.

In another aspect, a connection made by a user, or attempted to be made by a user, from a source interface to a destination interface that is incompatible with the source interface is disallowed. For example, consider the case in which interface 230 is not connected to another signal and, as such, is available. If interface 230 is not compatible with interface 225, the EDA tool prevents the user from drawing a connection from interface 225 to interface 230.

Figure 3A:
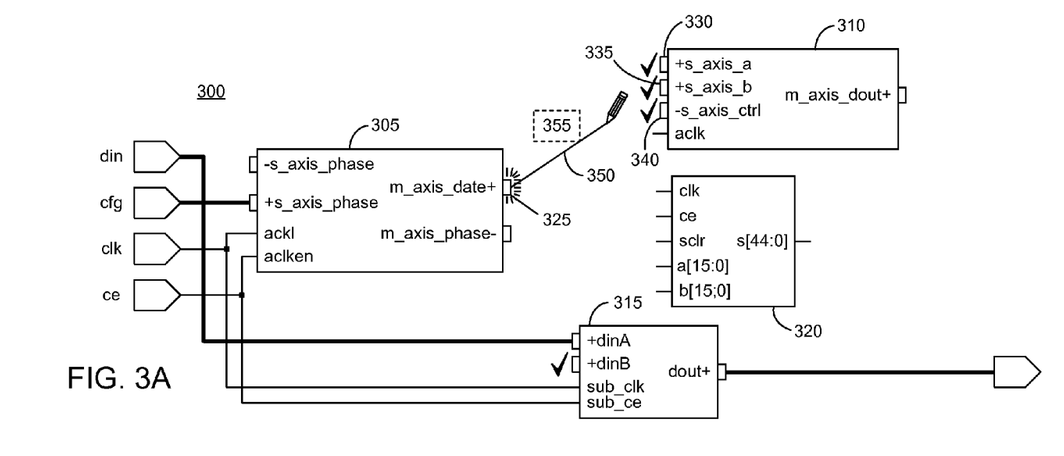
FIGS. 3A and 3B illustrate different states of an exemplary view presented by the user interface of the EDA tool of FIG. 1.
Figure 3B:
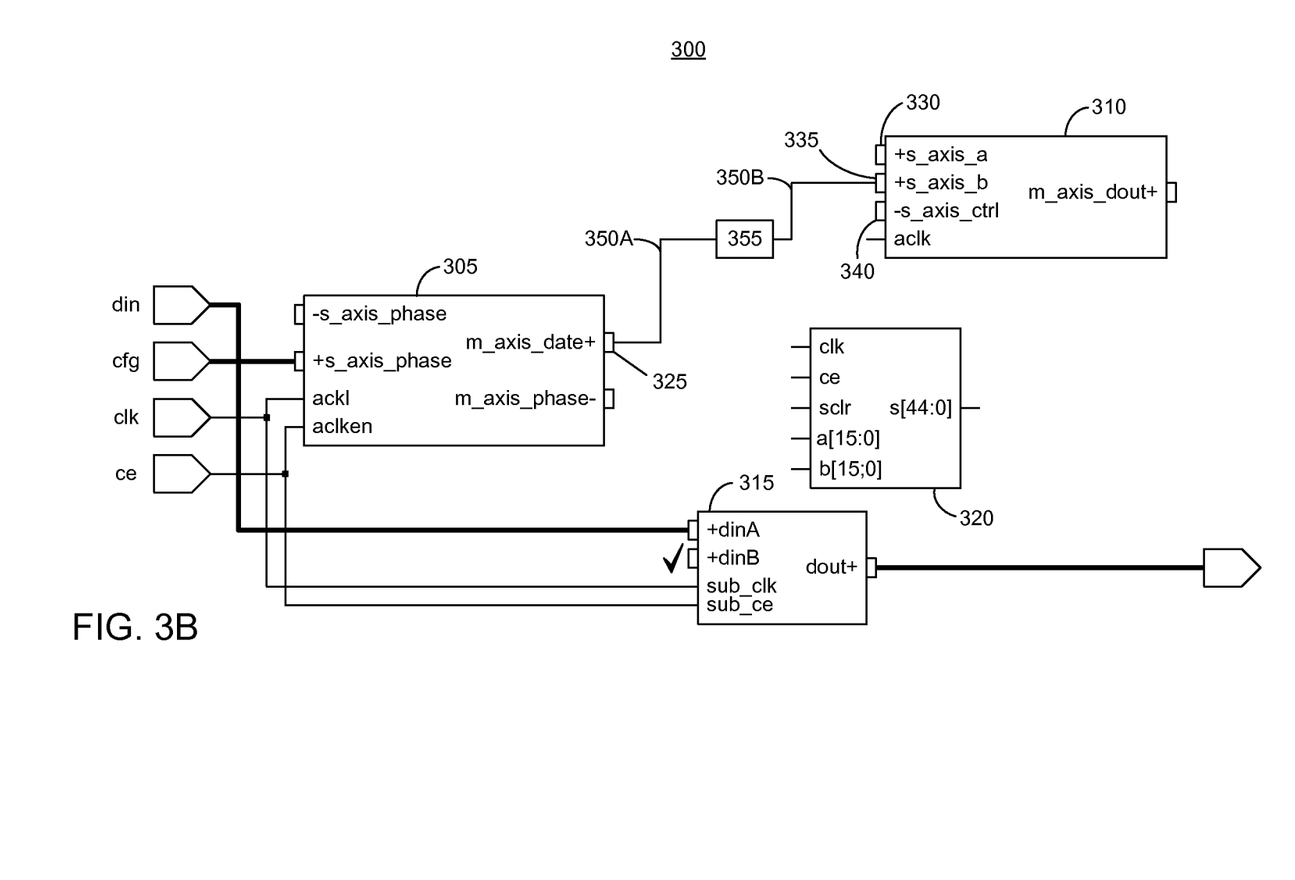

FIGS. 3A and 3B illustrate different states of an exemplary view 300 presented by the user interface of the EDA tool of FIG. 1. As shown, the view includes a plurality of pins illustrated as "din," "cfg," "clk," "ce," and "dout." View 300 further illustrates circuit blocks 305, 310, 315, and 320. In the example presented, the user has selected interface 325 as the source interface in a connection operation and is drawing connection 350.

Referring to FIG. 3A in particular, the user is moving the pointer from interface 325 to circuit block 310 as part of a connection operation. As discussed, the EDA tool determines that the distance between either circuit block 310 or interfaces 330, 335, or 340 of circuit block 310 and the pointer does not exceed the maximum distance. Accordingly, each of interfaces 330-340 is considered for compatibility with interface 325. In the example shown, each of interfaces 330-340 is considered compatible and, as such, is a candidate destination interface for connection 350. The EDA tool displays a visual element indicating compatibility next to each of interfaces 330-340.

In another aspect, the level of compatibility between source interface and destination interface also can be indicated. For example, two interfaces that are the same are considered to have one level of compatibility. Two interfaces that are not the same, but carry same data that may be formatted differently, have a different width, etc., still may be considered compatible, but require additional processing or adjustment in order to make a connection. Such a source interface and a destination interface, while still compatible, have a different level of compatibility. In this case, interface 325 is visually highlighted to indicate to the user that an adjustment may be required in order to establish a connection with one or more of interfaces 330-340.

Consider the case in which the user has completed connection 350 by continuing the line to interface 335. Interface 335 has a different width than interface 325. In that case, the EDA tool provides a different visual indication to inform the user that a modification or adjustment to either circuit block 305 (e.g., interface 325) or to circuit block 310 (e.g., interface 335) will be required in order to create connection 350.

In another example, interface 325 and interface 335 may be configured to convey the same data, but use different formatting and/or protocols. In that case, both interfaces are compatible if an additional circuit block is included. A further visual indication can be provided notifying the user that an additional circuit block referred to as an intermediary circuit block 355 (using dashed lines), is required to perform the necessary data conversion in order to connect interface 325 with interface 335. In that case, a connection would be established from interface 325 to an input interface of the intermediary circuit block. An output interface of the intermediary circuit block would be connected to interface 335. In one example, the EDA tool notifies the user of the necessity of intermediary circuit block 355. In another example, the EDA tool automatically inserts intermediary circuit block 355 and establishes the necessary connections responsive to the user completing connection 350, e.g., selecting the candidate destination interface (interface 335) in this example as the destination interface.

It should be appreciated that the type of visual indication can be any of a variety of different types. For example, rather than provide the visual indication in association with interface 325 indicating a level of compatibility, the visual indication that the user needs to modify a circuit block or interface or the visual indication that an intermediary circuit block is required can be displayed in association, e.g., next to, interface 335 or the relevant interface. A visual element indicating the intermediary circuit block can be displayed and located in connection 350 also as illustrated.

FIG. 3B illustrates view 300 in a state in which the user has selected candidate destination interface 335 of circuit block 310 as the destination interface and termination point for connection 350. In the example shown, the EDA tool has automatically inserted intermediary circuit block 355 into the circuit design. In addition, connection 350 is created and includes a first portion 350A and a second portion 350B. First portion 350A connects source interface 325 to an input interface (not shown) of intermediary circuit block 355. Second portion 350B connects an output interface (not shown) of intermediary circuit block 355 with interface 335.

Figure 4:
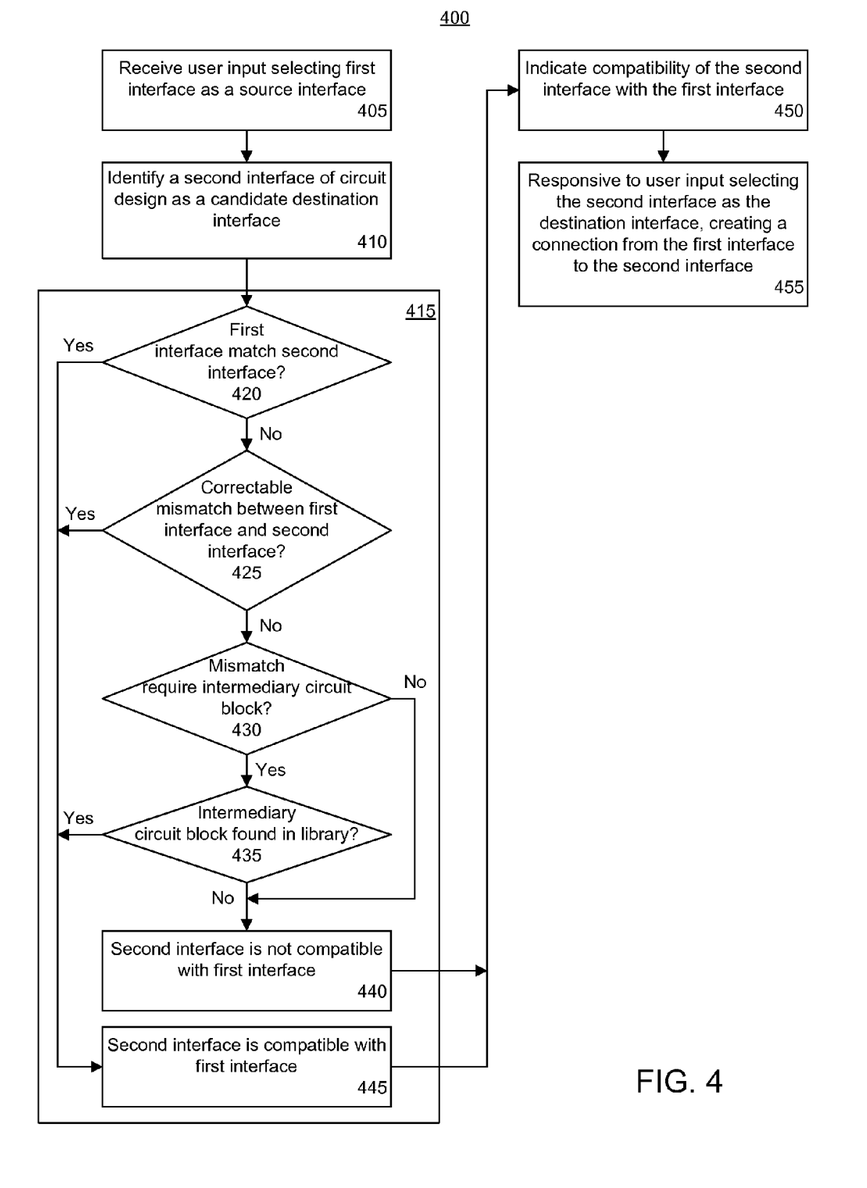
FIG. 4 is an exemplary method of providing guided connection assistance.

FIG. 4 is an example of a method 400 of providing guided connection assistance. Method 400 can be performed by an EDA tool as described within this specification. Method 400 can begin in a state where a user has started creating and/or editing a circuit design using the EDA tool. Further, the user has initiated a connection operation in order to create a connection from a source interface to a destination interface. Accordingly, method 400 is performed in the context of an ongoing connection operation implemented within an EDA tool, e.g., under user control.

In block 405, the EDA tool receives a user input selecting a first interface as a source interface for the connection that is to be created. In one aspect, the first interface is selected by the user beginning to draw a connection in the form of a line. The origination point of the line, and thus connection, is the first or source interface.

In block 410, a second interface of the circuit design is selected as a candidate destination interface. The second interface is one in which the distance between the second interface or the circuit block having the second interface and the pointer does not exceed the maximum distance. It should be appreciated that while only one interface is discussed as the "second interface" or a "candidate destination interface," more than one interface can be so identified, e.g., be a distance that does not exceed the maximum distance from the pointer. A single interface is used for ease of illustration and clarity, but is not intended as a limitation of the features described within this specification.

In block 415, the EDA tool begins a process of determining compatibility, or level of compatibility, between the first interface and the second interface. As noted, each circuit block is a visual element representing a definition of circuitry within the circuit design. The definition can specify one or more parameters and/or functionality of the circuitry. Similarly, each interface is a visual element presented within the EDA tool that represents an interface definition including one or more parameters that, taken collectively, specify the interface. Using the definitions as described, e.g., a list of parameters for purposes of comparison, allows the EDA tool to determine compatibility early in the design process as the user is creating connections among circuit blocks without, for example, first generating hardware description language specifying the circuit blocks and/or the interfaces.

In block 420, the EDA tool determines whether the first interface matches the second interface. As discussed, the EDA tool compares the first interface (e.g., the definition of the first interface) with the second interface (e.g., the definition of the second interface). If the first interface matches the second interface, method 400 proceeds to block 445. A match in accordance with block 420 indicates a first level of compatibility. If not, method 400 continues to block 425.

In block 425, the EDA tool determines whether there is a correctable mismatch between the first interface and the second interface. A correctable mismatch is where the first interface matches the second interface in all respects except for one or more parameters that, once edited, do match. A correctable mismatch is a second level of compatibility.

In one example, the mismatched parameters can be corrected manually by a user. The user, for example, manually edits a parameter using the EDA tool or another editor so that the mismatched parameter(s) match. In illustration, the first and the second interface may not match only in that the first interface includes a port size of [0:7], while the second interface includes a port size of [0:16]. A difference in width between the first interface and the second interface such as this is an example of a mismatch that a user can correct by editing either the source interface (or circuit block) and/or the destination interface (or circuit block) so that both interfaces have a same width.

In another example, the mismatched parameter(s) can be corrected automatically by the EDA tool. The EDA tool is configured to propagate parameters from one circuit block and interface to a next (connected) circuit block and interface. While this process is not performed in real time as is the compatibility indication performed during the creation of a connection, if the mismatch is one that would be corrected automatically by the EDA tool in performing parameter propagation, the EDA tool determines that the mismatch is correctable. A mismatch in width as discussed is also an example of one that is correctable automatically by the EDA tool. Thus, in either case of a correctable mismatch, the first and second interfaces are considered compatible whether the mismatch is corrected by the user or automatically by the EDA tool at another time, e.g., after the connection is made. Still, it should be appreciated that the EDA tool can, in another example, automatically correct the mismatch responsive to the user selecting the candidate destination interface as the destination interface for the connection.

In one aspect, the EDA tool can maintain a list of correctable mismatches. If the mismatch is not one that is considered correctable, e.g., on the list, method 400 proceeds to block 430. In block 430, the EDA tool determines whether the mismatch requires insertion of an intermediary circuit block. If so, method 400 proceeds to block 435. If not, method 400 continues to block 440.

For example, the first interface can be an Advanced eXtensible Interface (AXI)-Stream interface that is carrying Video data in RGB format. The second interface can be another AXI-Stream interface accepting YUV color space format. The EDA tool can determine that the base data types are compatible, but that the data requires re-formatting as performed by another circuit block referred to as an intermediary circuit block that can be inserted in the connection between the first interface and the second interface.

In block 435, the EDA tool determines whether an intermediary circuit block is available within a library of available circuit blocks. The EDA tool can search for a circuit block that performs the needed data transformation or other operation. If an intermediary circuit block is located within the library, method 400 continues to block 445, e.g., corresponding to a third level of compatibility. If not, method 400 proceeds to block 440.

In block 440, the EDA tool determines that the second interface is not compatible with the first interface. After block 440, method 400 proceeds to block 450. In block 444, the EDA tool determines that the second interface is compatible with the first interface. In one aspect, the level of compatibility is determined according to the path taken through block 415. After block 445, method 400 proceeds to block 450.

Continuing with block 450, the EDA tool can indicate compatibility of the second interface with the first interface. Compatibility can be indicated using any of the various exemplary techniques described herein. In general, compatibility is indicated by distinguishing the second interface from other interfaces that are not compatible with the first interface.

As discussed, the visual indication of compatibility can also indicate the level of compatibility determined in block 415. For example, the compatibility indicator that is used can indicate compatibility in which (1) the second interface is an exact match for the first interface corresponding to the "yes" branch from block 420; (2) the second interface has a correctable mismatch with respect to the first interface corresponding to the "yes" branch from block 425; (3) an intermediary circuit block is needed and is available corresponding to the "yes" branch of block 435; or (4) an intermediary circuit block is needed but unavailable corresponding to the "no" branch from block 435 (not compatible). As discussed, incompatible interfaces can be left as is or indicated with a distinctive visual element indicating incompatibility with the first interface (e.g., corresponding to the "no" branch from block 430).

Accordingly, the particular visual indicator that is correlated with the determined level of compatibility can be presented or displayed upon the screen in association with, e.g., next to, the candidate destination interface.

In block 455, responsive to a user input that selects the second interface (the candidate destination interface) as the destination interface, the EDA tool can create a connection from the first interface to the second interface. As discussed, in one aspect, the candidate destination interface is selected as the destination interface by ending the connection (line) at the candidate destination interface. Creating the connection as described presumes that the second interface has been determined to be compatible with the first interface. In one aspect, when a mismatch is to be corrected, the EDA tool can correct the mismatch, e.g., automatically responsive to selecting the candidate destination interface as the destination interface, or create the connection without correcting the mismatch. For example, the EDA tool can query the user whether to correct the mismatch or do so automatically based upon the state of a preference setting within the EDA tool. In another aspect, the EDA tool can automatically insert an intermediary circuit block if one is required when the intermediary circuit block is available. The EDA tool can do so automatically or query the user whether to insert the intermediary circuit block when creating the connection. Further, the EDA tool can insert the intermediary circuit block automatically according to the state of a user preference setting when such an intermediary block is needed and available.

As noted, in the event that the second interface is not compatible with the first interface, the EDA tool does not allow a connection to be created. If the user stops drawing the line and/or does not select a candidate destination interface as the destination interface, the connection creation operation is terminated without creating any connection.

While largely graphical-based techniques for connection assistance are been described, other techniques can be used. In another example, a user can type commands, e.g., (Tool Command Language) Tcl commands, through a command line type of interface of the EDA tool. The command can be one that instructs the EDA tool to form a connection between a first (source) interface and a second (destination) interface. The interfaces can be specified in the form of operands of a command. In such an embodiment, the EDA tool can be configured to use auto-complete to suggest or allow only interfaces that are compatible with the source interface (candidate destination interface) as an argument for the destination interface. Further, if desired, the interfaces that are considered for compatibility can be limited to a subset that is within a predetermined area and/or distance of the source interface.

For purposes of explanation, specific nomenclature is set forth to provide a thorough understanding of the various inventive concepts disclosed herein. The terminology used herein, however, is for the purpose of describing particular embodiments only and is not intended to be limiting. For example, the terms "a" and "an," as used herein, are defined as one or more than one. The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

The term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Within this specification, the same reference characters are used to refer to terminals, signal lines, wires, and their corresponding signals. In this regard, the terms "signal," "wire," "connection," "terminal," and "pin" may be used interchangeably, from time-to-time, within this specification. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

Features disclosed within this specification can be realized in hardware or a combination of hardware and software. One or more features can be realized in a centralized fashion in one system or in a distributed fashion where different elements are spread across several interconnected systems. Any kind of data processing system or other apparatus adapted for carrying out at least a portion of the methods described herein is suited.

One or more features further can be embedded in a device such as a computer program product, which comprises all the features enabling the implementation of the methods described herein. The device can include a data storage medium, e.g., a non-transitory computer-usable or computer-readable medium, storing program code that, when loaded and executed in a system including a processor, causes the system to perform at least a portion of the functions described within this specification. Examples of data storage media can include, but are not limited to, optical media, magnetic media, magneto-optical media, computer memory such as random access memory, a bulk storage device, e.g., hard disk, or the like.

Accordingly, the flowchart and block diagrams in the Figures illustrate the architecture, functionality, and operation of possible implementations of systems, methods and computer program products according to various embodiments of the one or more embodiments disclosed herein. In this regard, each block in the flowchart or block diagrams may represent a module, segment, or portion of code, which includes one or more executable instructions for implementing the specified logical function(s). It should also be noted that, in some alternative implementations, the functions noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terms "computer program," "software," "application," "computer-usable program code," "program code," "executable code," variants and/or combinations thereof, in the present context, mean any expression, in any language, code or notation, of a set of instructions intended to cause a system having an information processing capability to perform a particular function either directly or after either or both of the following: a) conversion to another language, code, or notation; b) reproduction in a different material form. For example, program code can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

Thus, throughout this specification, statements utilizing terms such as "processing" or "computing" or "calculating" or "determining" or "displaying" or the like, refer to the action and processes of a data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

The corresponding structures, materials, acts, and equivalents of all means or step plus function elements in the claims below are intended to include any structure, material, or act for performing the function in combination with other claimed elements as specifically claimed.

One or more features disclosed within this specification can be embodied in other forms without departing from the spirit or essential attributes thereof. Accordingly, reference should be made to the following claims, rather than to the foregoing specification, as indicating the scope of the features described.

What is claimed is:

1. A method of circuit design, the method comprising:
   receiving a user input selecting a first interface of a circuit block of a circuit design as a source interface in creating a connection within the circuit design;
   selecting, using a processor, a second interface of the circuit design as a candidate destination interface for the connection;
   determining compatibility between the second interface and the first interface; and
   indicating compatibility of the second interface with the first interface for the connection;
   wherein the second interface is selected according to a location of a pointer during a user-initiated connection operation beginning at the first interface on a screen; and
   wherein the second interface is selected responsive to determining that a distance between the second interface and the pointer does not exceed a maximum distance.

2. The method of claim 1, wherein the second interface is selected responsive to determining that a distance between a circuit block including the second interface and the pointer does not exceed a maximum distance.

3. The method of claim 1, wherein determining compatibility comprises:
   determining one of a plurality of different compatibility levels between the second interface and the first interface;
   wherein each compatibility level is correlated with a unique visual indicator; and
   wherein indicating compatibility comprises displaying the visual indicator correlated with the compatibility level.

4. The method of claim 1, wherein determining compatibility comprises:
   determining that an intermediary circuit block is required to connect the first interface to the second interface.

5. The method of claim 4, wherein indicating compatibility of the second interface with the first interface comprises:
   indicating that the intermediary circuit block is required.

6. The method of claim 5, further comprising:
   responsive to a user input selecting the candidate destination interface as the destination interface for the connection, creating the connection with the intermediary circuit block inserted in the connection.

7. A user interface (UI) of an electronic design automation tool, the UI comprising:
   a screen configured by a processor to display visual elements representing portions of a circuit design;
   a first visual element displayed on the screen representing a first circuit block of the circuit design;
   a second visual element displayed on the screen representing a first interface of the first circuit block;
   a third visual element displayed on the screen representing a second interface of the circuit design; and
   a fourth visual element displayed on the screen indicating compatibility of the first interface with the second interface;
   wherein the first, second, third, and fourth visual elements are displayed concurrently;

wherein the fourth visual element is displayed during a user-initiated connection operation in which the second visual element representing the first interface is a source interface; and wherein the second interface is selected as a candidate destination interface responsive to determining that a distance between the third visual element and a pointer does not exceed a maximum distance.

8. The UI of claim 7, wherein the second interface is selected as the candidate destination interface for evaluating compatibility with the first interface according to the distance between the third visual element representing the second interface and the pointer during the connection operation.

9. The UI of claim 7, wherein the second interface is selected as the candidate destination interface responsive to determining that the distance between a fifth circuit element representing a circuit block including the second interface and the pointer does not exceed a maximum distance.

10. The UI of claim 7, wherein the fourth visual element indicates one of a plurality of different compatibility levels between the second interface and the first interface.

11. The UI of claim 7, wherein the fourth visual element further indicates whether an intermediary circuit block is required to connect the first interface to the second interface.

12. The UI of claim 11, further comprising:
a fifth visual element representing the intermediary circuit block;
wherein the fifth visual element is displayed onscreen responsive to a user input selecting the second interface as a destination interface of a connection with the first interface; and
wherein the fifth visual element is in the connection.

13. A non-transitory computer-readable medium with an executable program stored thereon, wherein the program when executed on a processor performs a method comprising:
receiving a user input selecting a first interface of a circuit block of a circuit design as a source interface in creating a connection within the circuit design;
selecting a second interface of the circuit design as a candidate destination interface for the connection;
determining compatibility between the second interface and the first interface; and
indicating compatibility of the second interface with the first interface for the connection;
wherein the second interface is selected as the candidate destination interface according to a location of a pointer during a user-initiated connection operation beginning at the first interface on a screen; and
wherein the second interface is selected as the candidate destination interface responsive to determining that a distance between the second interface and the pointer does not exceed a maximum distance or determining that a distance between a circuit block including the second interface and the pointer does not exceed the maximum distance.

14. The medium of claim 13, wherein determining compatibility comprises:
determining one of a plurality of different compatibility levels between the second interface and the first interface;
wherein each compatibility level is correlated with a unique visual indicator; and
wherein indicating compatibility comprises displaying the visual indicator correlated with the compatibility level.

* * * * *